(12) United States Patent
Lea (10) Patent No.: US 11,729,844 B2
(45) Date of Patent: Aug. 15, 2023

(54) DEVICE PAIRING VIA TWO WIRELESS COMMUNICATION PROTOCOLS

(71) Applicant: Microsoft Technology Licensing, LLC, Redmond, WA (US)

(72) Inventor: Perry Victor Lea, Eagle, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 17/313,713

(22) Filed: May 6, 2021

(65) Prior Publication Data
US 2022/0361263 A1 Nov. 10, 2022

(51) Int. Cl.
*H04W 76/14* (2018.01)
*H04W 48/12* (2009.01)

(52) U.S. Cl.
CPC .......... *H04W 76/14* (2018.02); *H04W 48/12* (2013.01)

(58) Field of Classification Search
CPC ..... H04W 76/14; H04W 88/06; H04W 76/15; H04W 92/18; H04W 76/10; H04W 72/1215; H04W 76/23; H04W 28/0273; H04W 56/001; H04W 48/01; Y02D 30/70
See application file for complete search history.

(56) References Cited

U.S. PATENT DOCUMENTS

| | | | | |
|---|---|---|---|---|
| 2010/0278345 A1* | 11/2010 | Alsina | ................... | H04W 12/06 709/227 |
| 2013/0029596 A1 | 1/2013 | Preston et al. | | |
| 2013/0178160 A1* | 7/2013 | Wang | .................... | H04W 48/10 455/41.2 |
| 2020/0077456 A1* | 3/2020 | Chen | ..................... | H04W 76/14 |
| 2020/0194004 A1* | 6/2020 | Bates | ..................... | H04L 67/125 |
| 2021/0266808 A1* | 8/2021 | Avadhanam | ...... | H04W 36/0022 |
| 2021/0373110 A1* | 12/2021 | Khan | ...................... | G01S 1/024 |

FOREIGN PATENT DOCUMENTS

EP 2615869 A1 7/2013

OTHER PUBLICATIONS

"International Search Report and Written Opinion Issued in PCT Application No. PCT/US22/024718", dated Jul. 4, 2022, 11 Pages.

* cited by examiner

*Primary Examiner* — Awet Haile
(74) *Attorney, Agent, or Firm* — Alleman Hall Creasman & Tuttle LLP (57) ABSTRACT

A method for a computing device. The method includes periodically transmitting a beaconing data packet via a first wireless communication protocol. The first wireless communication protocol supports low bandwidth, one-directional communication. The computing device receives a request to pair from a peripheral computing device via a second wireless communication protocol. The second wireless communication protocol supports higher bandwidth, two-directional communication. The request to pair includes information that was included in the beaconing data packet. Responsive to receiving the request to pair, the computing device initiates pairing with the peripheral computing device via the second wireless communication protocol.

17 Claims, 8 Drawing Sheets

DEVICE PAIRING VIA TWO WIRELESS COMMUNICATION PROTOCOLS

BACKGROUND

Personal computers, gaming systems, and numerous other devices rely on peripheral devices to provide input and control information supplied by a user. Many peripheral devices communicate with their parent computing system via wireless communications. Providing wireless communication between devices requires establishing pairing between the devices. Pairing may take place over various communication protocols and may require user interaction to initiate and validate the pairing, particularly when the protocol mediates encoded or encrypted communications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for a computing device. The method includes periodically transmitting a beaconing data packet via a first wireless communication protocol. The first wireless communication protocol supports low bandwidth, one-directional communication. The computing device receives a request to pair from a peripheral computing device via a second wireless communication protocol. The second wireless communication protocol supports higher bandwidth, two-directional communication. The request to pair includes information that was included in the beaconing data packet. Responsive to receiving the request to pair, the computing device initiates pairing with the peripheral computing device via the second wireless communication protocol.

DETAILED DESCRIPTION

Wireless gaming controllers, input devices, and accessories require "pairing" or association with a console or a host device (e.g., a personal computer). Any new console without a hard-wired input device must establish a pairing before the controller is able to control the console. Any new tandem of a computing device and input device requires such pairing to allow inter-device communication.

Figure 1:
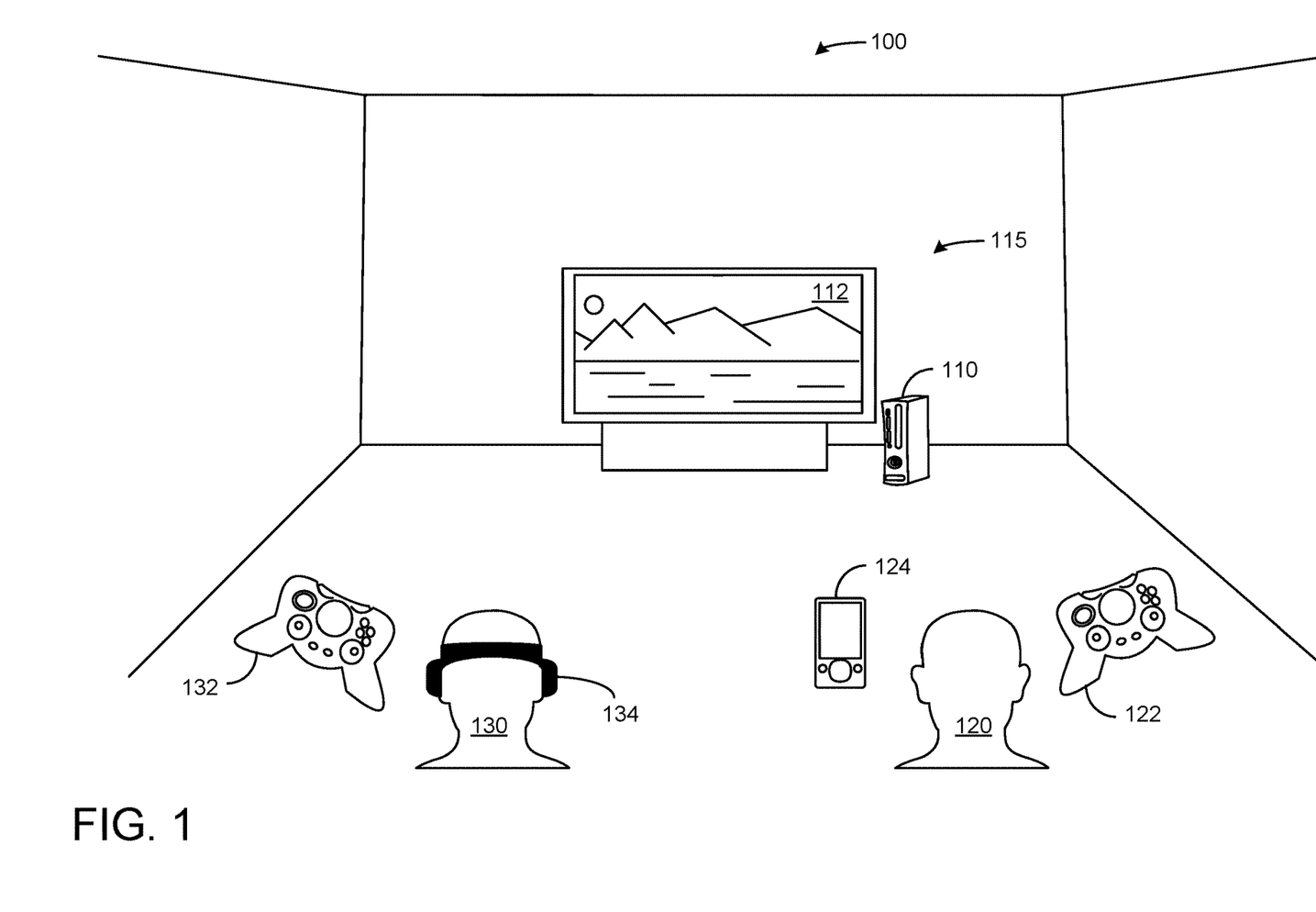
FIG. 1 shows an example environment for pairing a computing device to one or more peripheral computing devices.

FIG. 1 shows an example computing environment 100 including a computing device 110. In this example, computing environment is a domestic room, and computing device 110 is a gaming console communicatively coupled to at least a display device 112. Computing device 110 is connected to at least one wireless network 115.

A first user 120 may seek to pair a wireless controller 122 to computing device 110, for example via wireless network 115. Wireless controller 122 may be configured to communicate with computing device 110 in two directions, both sending input commands and signals to computing device 110, as well as receiving signals that may impact the performance of wireless controller 122, such as triggering lights, sounds, haptic motors, etc., activating or deactivating buttons, and other features related to gameplay and/or user input. First user 120 may additionally seek to pair a personal mobile computing device 124 to computing device 110 and/or to wireless controller 122. First user 120 may employ personal mobile computing device 124 to add additional levels of user input, to receive additional feedback from computing device 110, to connect to a cloud computing device, to access a user account, etc. Personal mobile computing device 124 may be capable of providing a wider range of inputs and receive a wider range of communication types than wireless controller 122, and/or may complement wireless controller 122 in providing input to, and conveying information from, computing device 110. For example, information may be relayed to first user 120 via personal mobile computing device 124 that would otherwise have been presented on display device 112, and thus visible to second user 130. Personal mobile computing device 124 may be configured to execute one or more applications specific to computing device 110 and/or to individual programs executed on computing device 110 to bridge the experience for the user across these devices.

Similarly, second user 130 may seek to pair a wireless controller 132 to computing device 110, for example via wireless network 115. Second user 130 may also seek to pair a wireless headset 134 to computing device 110 for the purposes of receiving auditory cues from and/or providing voice input to computing device 110. Accordingly, computing device 110 may need to pair with wireless devices from multiple users, and may need to coordinate pairing with multiple wireless devices from a single user.

This pairing process typically uses a manual setup for pairing via a wireless protocol service over the console's operating system. As an example, the controller may be turned on, a pairing button engaged, then, if the devices can detect each other via the wireless protocol, the user may be alerted to press a button on the console. Additional input via a display device, mobile phone, etc. may be required to confirm and complete the pairing. If the controller is already paired to a different console or mobile computing device, it may need to be re-paired to the new device, sometimes dissociating from the original paired device. To pair a mobile computing device with a console, the process may also require explicit wireless protocol settings and manual association to a device to pair it.

Herein, examples are described whereby a computing device and one or more peripheral computing devices are paired together through the use of two different wireless communication protocols. In some examples, a computing device periodically transmits a beaconing data packet via a first wireless communication protocol. This first protocol may be a low bandwidth, low energy broadcast that supports one-directional communication (e.g., Bluetooth beaconing). The beaconing data packet may alert peripheral computing devices within a working radius to the presence of the computing device. A peripheral computing device within this radius may receive the beaconing data packet and send a request to pair with the computing device via a second wireless communication protocol. This second protocol may be a higher bandwidth, higher energy protocol that supports two-directional communication (e.g., WiFi). The request to pair may include information from the beaconing data packet, for example as a form of verification. Upon receiving the request to pair, the computing device may initiate pairing with the peripheral computing device.

Such methodology enables a less frustrating out-of-the-box experience for users operating game consoles, game controllers, and the like. A user may simply turn on a controller which is programmed to look for beaconing data packets, confirm that a pairing is desired, and provide input to the console. In some examples, the peripheral computing device may emit the beaconing data packet, allowing for new consoles to quickly pair with an input device, enabling a user to rapidly engage with the console. As the initial engagement is one-directional, the beaconing may cast a wide, unsecured net for devices with which to pair. Then, a secure pairing can be initiated with candidate devices.

In some examples, the peripheral computing device may be a mobile computing device configured to operate an application specific for the computing device. The computing device may transmit informational data packets over the first wireless communication protocol, providing environmental information or other information for parsing and display via the application. This may allow for the console to transmit encoded or encrypted information to a user via the application using the first wireless computing protocol as a back channel. The application may further allow the peripheral computing device to receive data packets from a plurality of local beacons when within the radius of the local beacon. This may allow a user, once their mobile computing device is paired to a hub computing device, to receive specific information about nearby exhibits, installations, etc. at conferences, museums, or other installations.

Figure 2A:
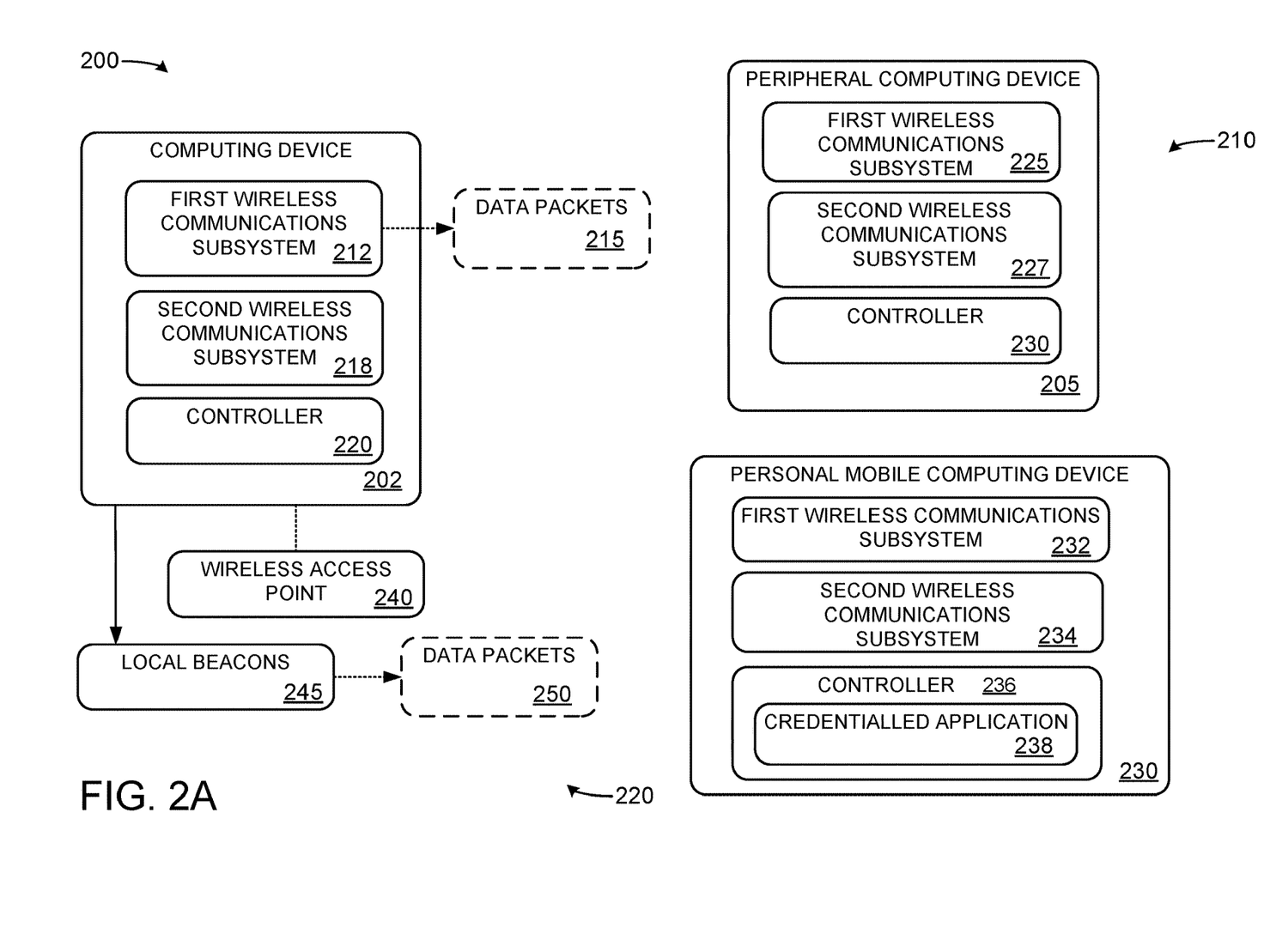
FIG. 2A schematically shows an example system for pairing a computing device to one or more peripheral computing devices.

FIG. 2A schematically shows an example system 200 for pairing a computing device 202 to one or more peripheral computing devices 205 within an environment 210. System 200 may thus facilitate secure wireless connections and communications between a computing device 202 and one or more peripheral computing devices 205. Computing device 202 may be a personal computer, gaming console, server, or other computing device, such as computing device 110 of FIG. 1. Additional forms and components of example computing devices are described herein and with regard to FIG. 6. Computing device 202 includes a first wireless communications subsystem 212. First wireless communications subsystem 212 may be configured to periodically transmit data packets 215 via a first wireless communication protocol, the first wireless communication protocol supporting low bandwidth, one-directional communication. For example, first wireless communication protocol may be a low energy beaconing protocol, such as Bluetooth low-energy, a wireless personal area network protocol, such as infrared data association (IrDA), wireless universal serial bus (USB), ZigBee, etc., near-me area network (NAN) protocols, or other low energy, low bandwidth wireless protocols that require two devices to be within a limited (e.g., <50 m) range to communicate.

Computing device 202 further includes a second wireless communications subsystem 218 configured to mediate two-directional communications with one or more peripheral computing devices 205 via a second wireless communication protocol, the second wireless communication protocol supporting higher bandwidth, higher energy communication than the first wireless communication protocol. For example, the second wireless communication protocol may be a wireless local area network (WLAN) protocol, such as Wi-Fi or other Institute of Electrical and Electronics Engineers (IEEE) 802.11 standard protocols. Second wireless communications subsystem 218 may mediate communication between computing device 202 and one or more peripheral computing devices 205 via wireless network 220. Wireless network 115 may be an example of wireless network 220.

Computing device 202 further includes a controller 222. Controller 222 may include a logic machine and a storage machine, among other components. A more detailed description of an example compute system is presented herein with regard to FIG. 6.

Peripheral computing device 205 includes first wireless communications subsystem 225, second wireless communications subsystem 227, and controller 230. Peripheral computing device 205 may be an input device, such as a gaming controller (e.g., wireless controllers 122 and 132), keyboard, mouse, joystick, trackpad, trackball, or other input device configured to provide command and control information to computing device 202 (e.g., wireless headset 134). First wireless communications subsystem 225 may mediate communications with computing device 202 via first wireless communications subsystem 212, and second wireless communications subsystem 227 may mediate communications with computing device 202 via second wireless communications subsystem 218, utilizing wireless network 220 in some examples.

In addition to or as an alternative to peripheral computing device 205, system 200 may include one more personal mobile computing devices 230. Personal mobile computing device 230 may be a smartphone, tablet, digital camera, or other device capable of executing software applications, such as personal mobile computing device 124. Personal mobile computing device 230 includes first wireless communications subsystem 232, second wireless communications subsystem 234, and controller 236. As described for peripheral computing device 205, first wireless communications subsystem 232 may mediate communications with computing device 202 via first wireless communications subsystem 212, and second wireless communications subsystem 234 may mediate communications with computing device 202 via second wireless communications subsystem 218, utilizing wireless network 220 in some examples.

Personal mobile computing device 230 may be configured to execute one or more credentialled applications 238. Credentialled application 238 may specifically targeted for use with computing device 202 and/or one or more applications executing on computing device 202.

Computing device 202 may use data packets 215 for simple data broadcasts and informational exchanges, such as for commands, identifications, and acknowledgements. Data packets 215 may include a payload with a variable length field, on the order of 16 bytes. In some examples, longer packets that chain together may be transmitted. Controller 222 may be configured to periodically transmit (e.g., at any regular or irregular interval(s)) a beaconing data packet via first wireless communications subsystem 212. Beaconing data packets may be broadcast, for example on the order of every 100-1000 ms. Beaconing data packets may be configured so that a peripheral computing device 205 receiving an associated payload can discern the contents of that payload.

Each beaconing data packet may include information about the identity and/or location of computing device 202 (one or more of physical location and virtual/digital location), types of peripheral computing devices 205 that are accepted for pairing, network information for pairing via second wireless communications subsystem 218, codes or credentials to verify that the peripheral computing device is within environment 210, etc. The beaconing data packet may be structured with different fields, including the payload, a length field that indicates the size of the payload, a data type field to inform an application of the data type, a flag field, a virtual channel identifier field, indicating which virtual channel to send the data packet on, etc. In this way, computing device 202 may advertise its presence via beaconing data packets to peripheral computing devices that are within the range of first wireless communications subsystem 212.

System 200 may further comprise a wireless access point 240, access to which is regulated by computing device 202. Credentials, such as SSID, for connecting to wireless access point 240 may be encoded in an informational data packet translatable by credentialled application 238. In this way, personal mobile computing device 230 may be used to hunt for wireless access points 240 using low-energy broadcasts via first wireless communications subsystem 232, rather than depleting batteries by operating higher-energy wireless interface components within second wireless communications subsystem 234 before attempting to connect to a specific wireless access point 240.

System 200 may include a plurality of local beacons 245 positioned within environment 210. Each local beacon 245 may include a controller, a broadcast transmitter, a power supply, and communication means to receive information from computing device 202. Each local beacon 245 may periodically and repeatedly transmit informational data packets 250 dispersed by computing device 202, each informational data packet 250 encoded for translation by credentialled application 238. Additional scenarios and use cases for local beacons 245 are discussed herein and with regard to FIG. 5.

Figure 2B:
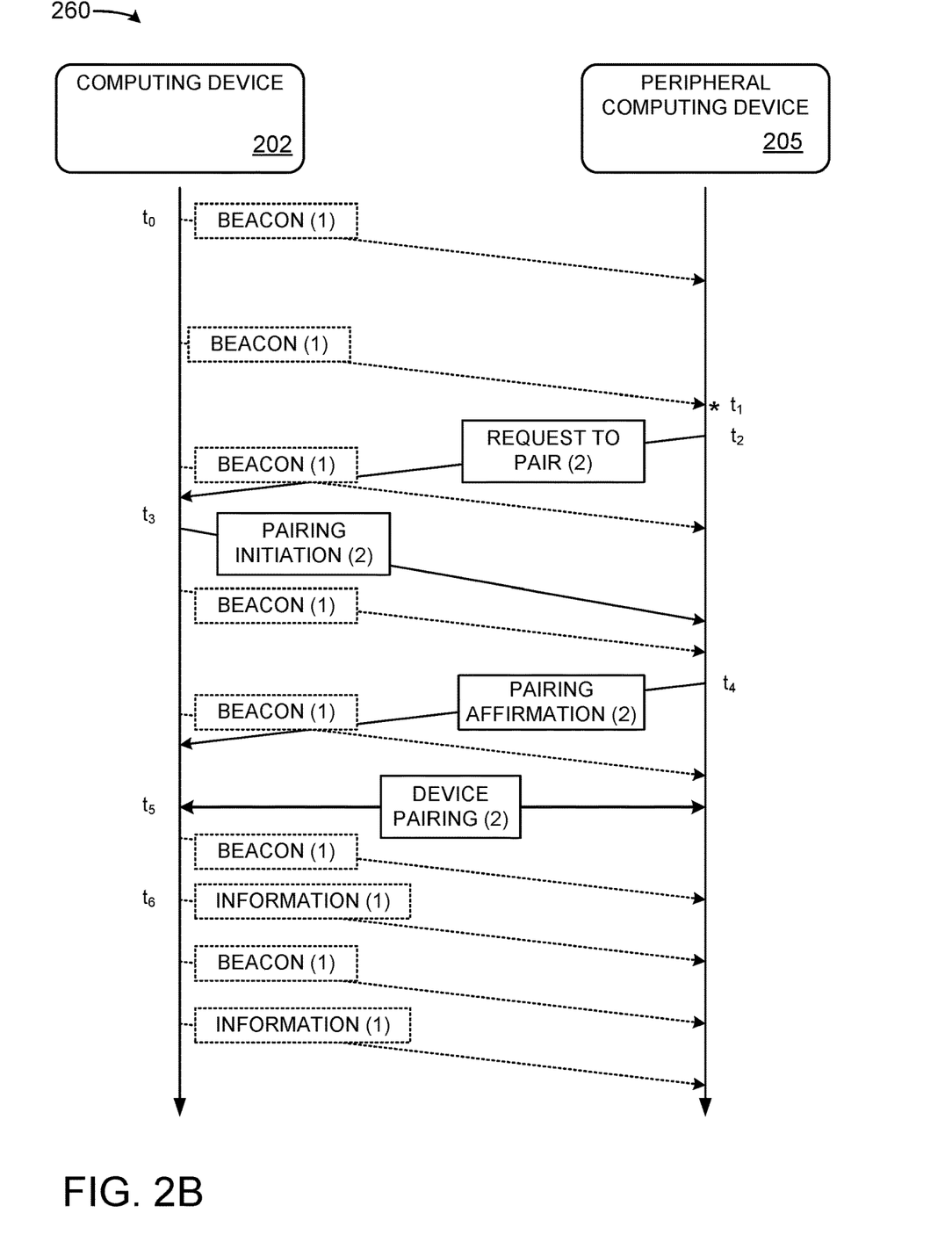
FIG. 2B illustrates an example timing interaction between a computing device and a peripheral computing device.

FIG. 2B illustrates an example timing interaction 260 between computing device 202 and peripheral computing device 205. Data transmissions via the first wireless communication protocol (1) are indicated by dotted lines, while data transmissions via the second wireless communication protocol (2) are indicated by solid lines. At time $t_0$, computing device 202 may periodically transmit beaconing data packets. At time $t_1$, peripheral computing device 205 may receive the beaconing data packet via first wireless communications subsystem 225 and send a pairing request to computing device 202 via second wireless communications subsystem 227 at time $t_2$. This pairing request may include information included in the beaconing data packet to verify that the peripheral computing device 205 is within environment 210. The pairing request may further include information specific to peripheral computing device 205, so that computing device 202 may identify the peripheral computing device 205 and direct pairing to that specific peripheral computing device, and not to any peripheral computing device operating within environment 210. At time $t_3$, computing device 202 may then initiate pairing with peripheral computing device 205 via the second wireless communications subsystem 218. As the range of the beaconing data packets is limited, this ensures that computing device 202 is only pairing with peripheral computing devices in a certain proximity. In some examples, peripheral computing device 205 may be configured to measure the signal strength associated with the beaconing data packets and thus determine from the signal strength whether the user is approaching or moving away from computing device 202 and direct the user to move towards computing device 202 if pairing is of interest. However, peripheral computing device 205 may not need to be within line-of-sight of computing device 202 in order to receive the beaconing data packet.

At time $t_4$, in response to receiving the pairing initiation, peripheral computing device 205 may transmit a pairing affirmation via the second wireless communication protocol. At time $t_5$, computing device 202 may complete device pairing with peripheral computing device 205. Throughout and following the pairing process, computing device 202 may continue to transmit beaconing data packets to mediate pairing with other peripheral computing devices within environment 210.

Once paired, computing device 202 may generate informational data packets targeted to a paired peripheral computing device 205, and may transmit the informational data packets via first wireless communications subsystem 212, as shown at time $t_6$. The informational data packets may be interspersed among the beaconing data packets. Informational data packets may relate to health, safety, and status information of computing device 202, peripheral computing device 205, and/or personal mobile computing device 230. Informational data packets may include titles of software or games currently being executed, strategic information, battery levels, available software updates, signal strength, and any pertinent information that is environmental to computing device 202, peripheral computing device 205, and/or personal mobile computing device 230. Such information may additionally or alternatively be transmitted via the second wireless communication protocol after successful pairing.

Figure 2C:
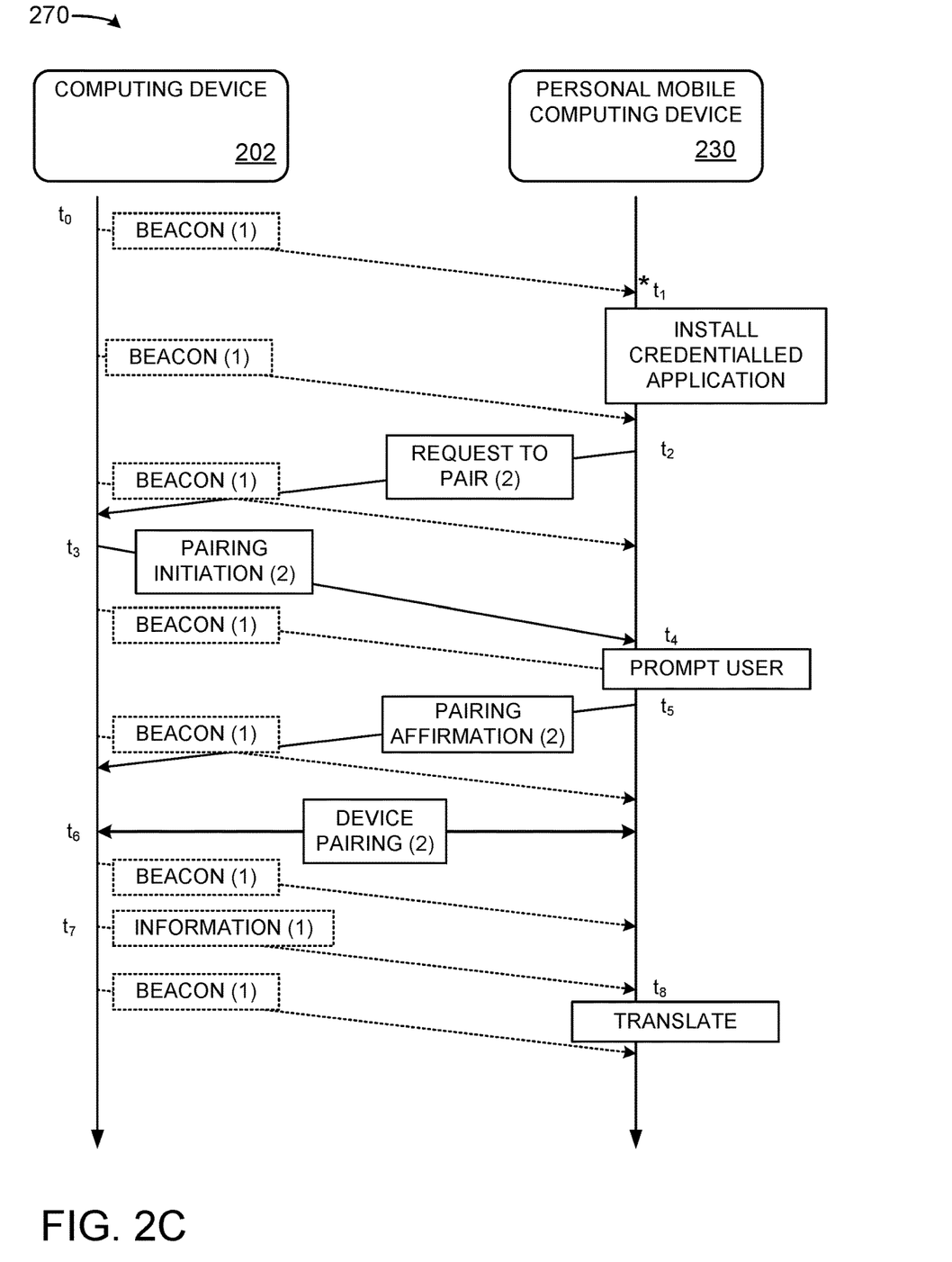
FIG. 2C illustrates an example timing interaction between a computing device and a personal mobile computing device.

FIG. 2C illustrates an example timing interaction 270 between computing device 202 and personal mobile computing device 230. At time $t_0$, computing device 202 may periodically transmit beaconing data packets. At time $t_1$, personal mobile computing device 230 may receive the beaconing data packet and launch (and optionally install if not already installed) a credentialled application 238, either automatically or by prompting the user. Credentialled application 238 may include a user interface (UI). A user of personal mobile computing device 230 may be able to initiate, guide, or otherwise manage the pairing process via the UI. Credentialled application 238 may be capable of recognizing and responding to computing devices emitting pairing beacons. The credentialled application would then alert the user to the presence of a computing device and/or peripheral computing device, and present the computing device and/or peripheral computing device to the user and prompt the user to associate the devices. At time $t_2$, responsive to user input, personal mobile computing device 230 may transmit a pairing request to computing device 202 via second wireless communications subsystem 227.

At time $t_3$, computing device 202 may then initiate pairing with peripheral computing device 205 via the second wireless communications subsystem 218. The pairing initiation may be parsed by credentialled application 238, which may prompt the user to affirm their desire to pair with computing device 202. Responsive to the user's input, at time $t_5$, peripheral computing device 205 may transmit a pairing affirmation via the second wireless communication protocol. At time $t_6$, computing device 202 may complete device pairing with peripheral computing device 205.

At time $t_7$, computing device 202 may generate and transmit informational data packets via first wireless communications subsystem 212. In some examples, the informational data packets are encoded and/or encrypted in a way that is translatable by a credentialled application 238 executing on paired personal mobile computing device 230, as shown at time $t_8$. The information included in such informational data packets may additionally or alternatively be transmitted via the second wireless communication protocol after successful pairing.

In many of the examples herein, first wireless communications subsystem 212 of computing device 202 is described as a broadcasting subsystem configured to send messages and/or signals via a signal transmission component at a relatively low power to limit communication to devices located within environment 210 at a particular distance from computing device 202. First wireless communications subsystem 225 of peripheral computing device 205 and first wireless communications subsystem 232 of personal mobile computing device 230 are primarily described as receiving subsystems, and may thus include broadcast receivers or other similar means of acquiring data packets 215. However, in some examples these roles may be reversed. In further examples, first wireless communications subsystem 212 of computing device 202, first wireless communications subsystem 225 of peripheral computing device 205 and first wireless communications subsystem 232 of personal mobile computing device 230 may include both broadcasting and receiving capabilities, and/or these two tasks may be split across additional wireless communications subsystems. Peripheral computing device 205 and personal mobile computing device 230 may thus send counter data packets to computing device 202, thus establishing a side-channel for communicating environmental information between devices without using bandwidth over wireless network 220. For example, a battery-operated gaming controller could transmit information to the gaming console regarding battery life. In return, if battery life decreases below a threshold, the gaming console may reduce or eliminate commands for haptic feedback, or other high energy functions of the gaming controller.

Personal mobile computing devices may also pair with, and/or associate with a peripheral computing device via their respective second wireless communications subsystems. In some examples, the pairing and/or association may be mediated by the devices' respective first wireless communications subsystems. A user wanting to associate a controller to a personal mobile computing device may download and install credentialled application 238. After launching credentialled application 238, the app would trigger first wireless communications subsystem 232 to look for counter beacons. Upon detecting a qualified peripheral computing device, credentialled application 238 may prompt the user to complete the pairing process on the personal mobile computing device.

Personal mobile computing device 230 and credentialled application 238 may be usable to associate a peripheral computing device 205 with wireless access point 240. When personal mobile computing device 230 has paired with both wireless access point 240 and peripheral computing device 205, a user's settings and other data, along with connectivity information for wireless access point 240 may be securely transferred to peripheral computing device 205. As configured, peripheral computing device 205 may then directly access a cloud computing device via wireless access point 240 and trigger the generation of a secure channel for controller-cloud communications, which may be bidirectional. This may allow a user to play cloud-based video games with a wireless game controller, for example, and/or to directly access audio data stored on the cloud through a wireless headset, without needing to use the computing device 202 as an intermediary. Credentialled application 238 may provide a visual user interface for this pairing, and may provide synchronized visual data to match the game play and/or audio listening in parallel, without requiring all data to be routed through personal mobile computing device 230.

Figure 3:
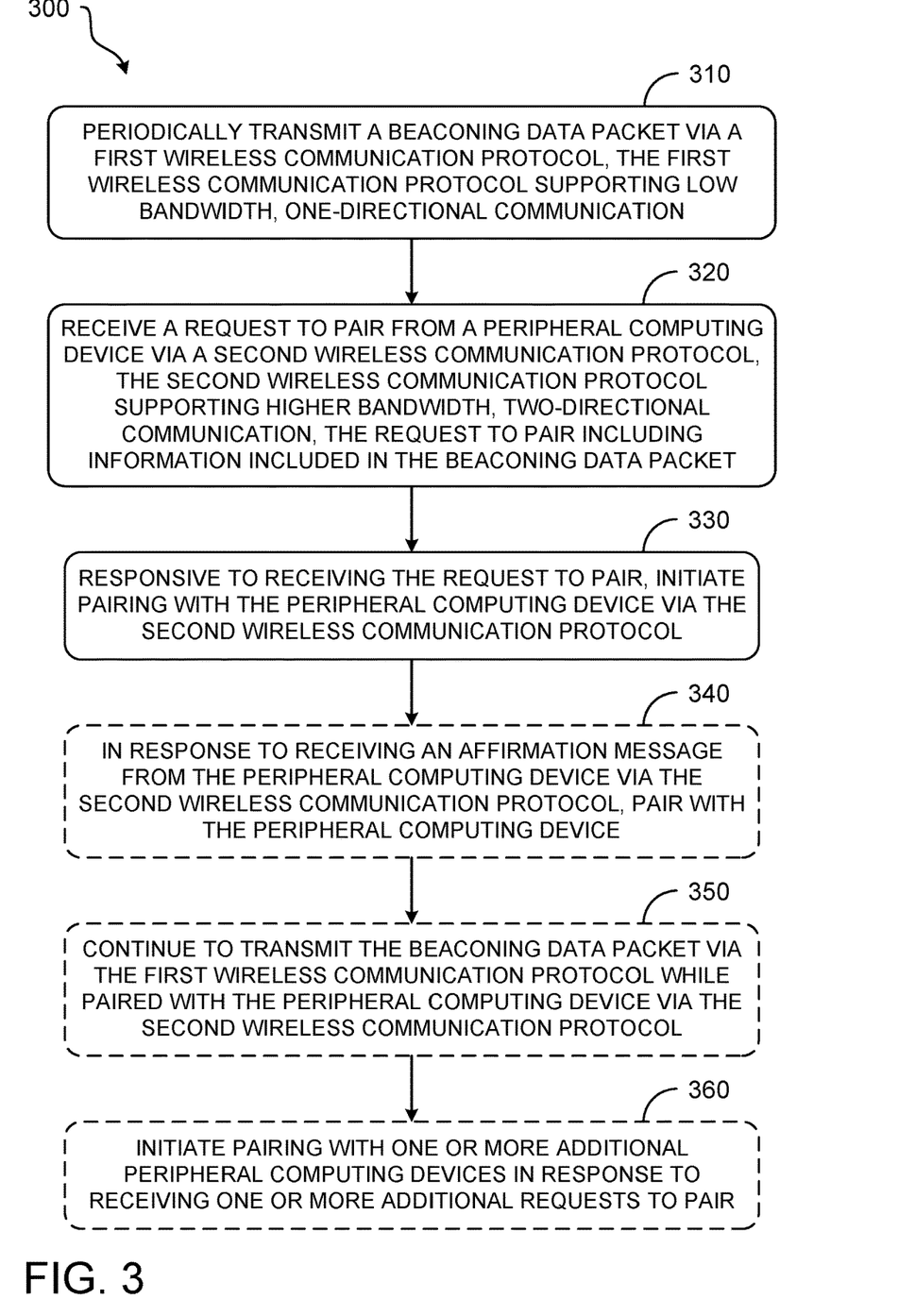
FIG. 3 depicts an example method for pairing a computing device to a peripheral computing device.

FIG. 3 shows an example method 300 for pairing a computing device to one or more peripheral computing devices. Method 300 may be executed by a controller, such as controller 220, operating within a computing device, such as a game console, server, personal computer, etc.

At 310, method 300 includes periodically transmitting a beaconing data packet via a first wireless communication protocol, the first wireless communication protocol supporting low energy, low bandwidth, one-directional communication.

The beaconing data packet may be considered as an advertisement for the computing device, and/or may comprise a short data transaction intended for peripheral computing devices listening for beaconing data packets within the environment. The beaconing data packet may include identification information for the computing device, such as an internet protocol (IP) address, operating system, etc., information regarding what types of peripheral computing devices may pair and how (e.g., only devices with certain wireless communications subsystem configurations), network identification information, other attributes that can be used to locate and communicate with the computing device, unique and/or random certification codes, etc.

Beaconing data packets may be transmitted constitutively (e.g., whenever the computing device is turned on), selectively (e.g., whenever there are no paired devices and/or a sub-threshold number of paired peripheral computing devices, or on-demand (e.g., in response to a user pressing a beaconing button on the computing device).

At 320, method 300 includes receiving a request to pair from a peripheral computing device via a second wireless communication protocol, the second wireless communication protocol supporting higher bandwidth, two-directional communication, the request to pair including information included in the beaconing data packet. For example, the peripheral computing device, having recognized and parsed the beaconing data packet.

At 330, method 300 includes, responsive to receiving the request to pair, initiating pairing with the peripheral computing device via the second wireless communication protocol. Initiating pairing may include broadcasting a pairing request via the second wireless communication protocol. In some examples, initiating pairing may include requesting user interaction via the peripheral computing device, such as presenting a graphic user interface (GUI) element on a display screen, audibly or visually indicating a button to press on the peripheral display screen (e.g., by triggering a light to flash on the peripheral computing device), etc.

Optionally, at 340, method 300 includes, in response to receiving an affirmation message from the peripheral computing device via the second wireless communication protocol, pairing with the peripheral computing device. The affirmation message may be a button press, a selection of an GUI element on a display screen, the flashing of a light pattern recognizable by a camera, etc.

Once the device pairing has been completed, the controller can optionally store details of this device pairing so that in the future if the peripheral device is reset, for example in a meeting room, the pairing could be automatically completed upon the first stage of initiation from either end. In some examples, maintaining the pairing may be dependent on the peripheral computing device returning dynamic information received from the computing device via one or more transmitted data packets, thus ensuring that the peripheral computing device is still within the environment occupied by the computing device.

Optionally, at 350, method 300 includes continuing to transmit the beaconing data packet via the first wireless communication protocol while paired with the peripheral computing device via the second wireless communication protocol. In this way, the computing device may pair with multiple peripheral computing devices, whether the peripheral computing devices are associated with the same user or different users. In some examples, the computing device may establish a maximum number of paired devices, and may thus terminate transmitting the beaconing data packet when the maximum number is reached. In other examples, the beaconing data packet may be adjusted when such a maximum number is reached, so as to inform peripheral computing devices that pairing is not currently available, to place the peripheral computing devices in a queue for pairing when the number of paired devices decreases below the maximum number, etc.

Optionally, continuing at 360, method 300 may include initiating pairing with one or more additional peripheral computing devices in response to receiving one or more additional requests to pair. In this way, the computing device may pair with multiple devices for the same user, and/or with peripheral computing devices for multiple users, allowing for collaborative work and/or shared game play for users within the same environment.

In some examples, one or more informational data packets are periodically transmitted via the first wireless communication protocol, the informational data packets interspersed with the beaconing data packets. Such informational data packets may include environmental information related to the peripheral computing device, the computing device, etc. The environmental information related to the peripheral computing device may be transmitted via the first wireless communication protocol while the computing device is paired with the peripheral computing device via the second wireless communication protocol.

In some examples, these informational data packets may be translatable by a credentialled application executing on the peripheral computing device, e.g., a personal mobile computing device. Such informational data packets may be encoded and/or encrypted by the controller, and the credentialled application may be configured to decode and/or decrypt the informational data packets, thereby ensuring that these informational data packets are readable only by their intended audience. Decoding and/or decrypting keys may be coded into the credentialled application inherently, or based on information exchanged between the computing device and the peripheral computing device during or after pairing.

Pairing with the peripheral computing device via the second wireless communication protocol may be mediated by the credentialled application. For example, the credentialled application may receive the content of the beaconing data packet, then present the identity of the parent computing device to a user via a UI as part of a prompt to either confirm or disconfirm pairing. The computing device may receive a translation of the user's input, and either initiate pairing with the peripheral computing device or disregard the pairing request.

In some examples, both the computing device and the peripheral computing device may include both a transmitter and receiver for the first wireless communication protocol. The method may then further comprise receiving counter data packets from the peripheral computing device over the first wireless communication protocol while paired with the peripheral computing device over the second wireless communication protocol. In this way, the computing device and peripheral computing device may establish an out-of-band communication channel, separate from the second wireless communication protocol. In some examples, the pairing sequence may be initiated by the peripheral computing device transmitting a beaconing data packet, with the controller listening for such beacons and identifying qualified peripheral computing devices, in addition to or as an alternative to transmitting a beaconing data packet from the computing device.

Figure 4:
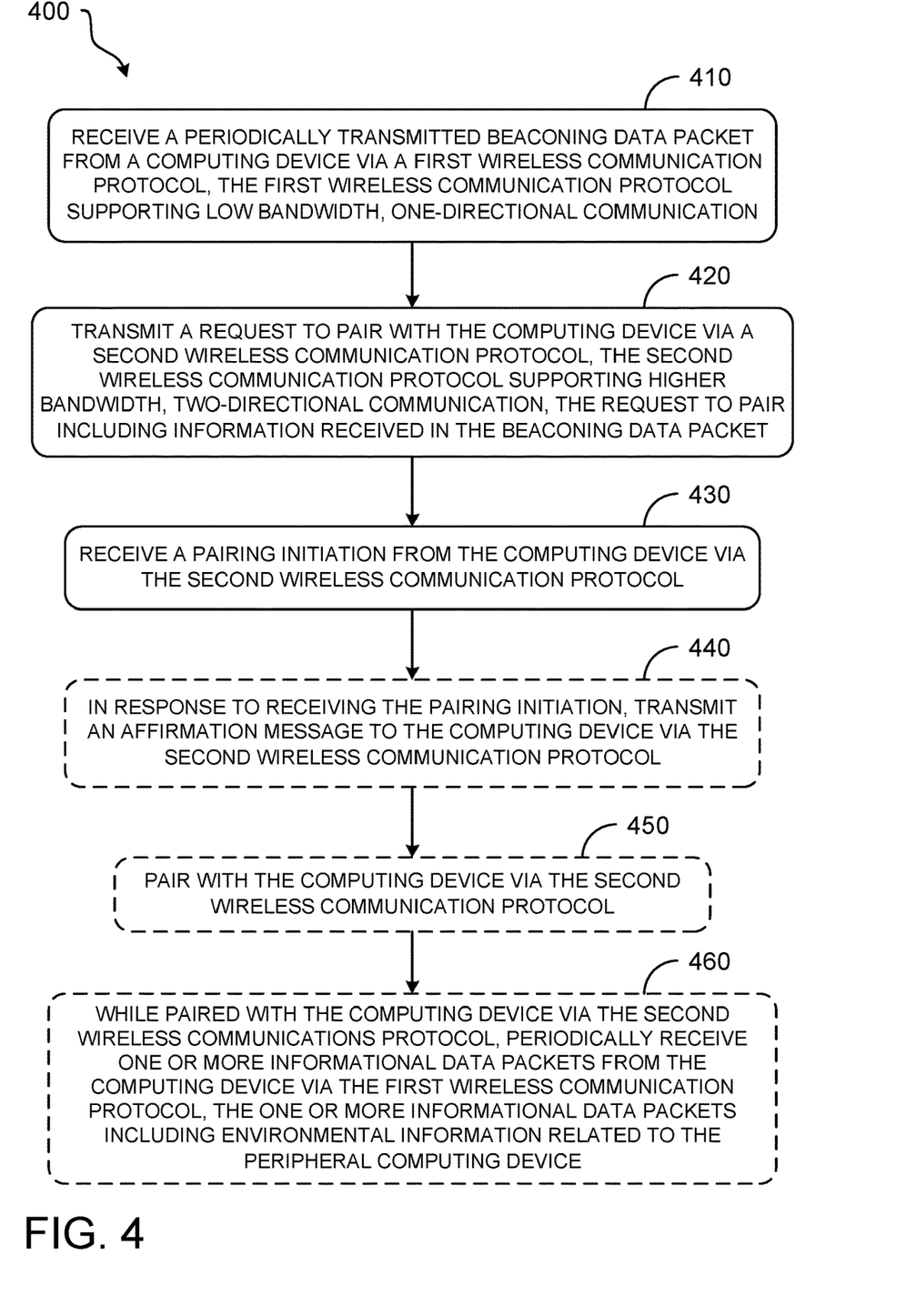
FIG. 4 depicts an example method for a peripheral computing device to a computing device.

FIG. 4 shows an example method 400 for pairing a peripheral computing device to one or more computing devices. Method 400 may be executed by a controller, such as controller 230 or controller 236, operating within a peripheral computing device or personal mobile computing device, such as a game controller, mobile phone, tablet computer, etc.

410 method 400 includes receiving a periodically transmitted beaconing data packet from a computing device via a first wireless communication protocol, the first wireless communication protocol supporting low bandwidth, one-directional communication. As such, the peripheral computing device may be within an area proximal to the computing device, based on the transmission radius of the first wireless communication protocol. The peripheral computing device may parse the beaconing data packet and analyze its content.

In some examples, responsive to receiving the periodically transmitted beaconing data packet from the computing device via the first wireless communication protocol, the peripheral computing device may indicate to a user that a beacon has been located in a local environment, such as by providing a visual, audio, and/or haptic signal.

At 420, method 400 includes transmitting a request to pair with the computing device via a second wireless communication protocol, the second wireless communication protocol supporting higher bandwidth, two-directional communication, the request to pair including information received in the beaconing data packet. For example, the beaconing data packet may include one or more encoded or encrypted elements, and/or security keys that are to be transmitted via the second wireless communication protocol to ensure the peripheral computing device has received the beaconing data packet and is thus within a radius of the computing device. The request to pair may be transmitted to the computing device based on the identification and/or location of the computing device, details of which may be included in the beaconing data packet.

At 430, method 400 includes receiving a pairing initiation from the computing device via the second wireless communication protocol. The pairing initiation may serve as a confirmation that the computing device and peripheral computing devices can be paired authentically and/or securely.

Optionally, at 440, method 400 includes, in response to receiving the pairing initiation, transmitting an affirmation message to the computing device via the second wireless communication protocol. The affirmation message may be transmitted in response to a user confirming the pairing between the peripheral computing device and the computing device. Optionally, at 450, method 400 includes pairing with the computing device via the second wireless communication protocol.

Optionally, at 460, method 400 includes, while paired with the computing device via the second wireless communications protocol, periodically receiving one or more informational data packets from the computing device via the first wireless communication protocol, the one or more informational data packets including environmental information related to the peripheral computing device.

In some examples, the peripheral computing device may be a personal mobile computing device, which may entail executing a credentialled application on the personal mobile computing device to mediate pairing with the computing device, as described with regard to FIG. 2A. In some examples, the personal mobile computing device may be able to recognize information from the initial beaconing data packet without having the credentialled application active. In such a scenario, the user may be prompted to install or log in to the credentialled application before proceeding with device pairing.

Methods 300 and 400 may thus enable a seamless out of the box experience for a user setting up a computing device and/or peripheral computing device. By simply turning on the computing device and peripheral computing device, and bringing them into proximity within the radius of the first wireless communications protocol, the devices may initiate pairing with each other in a proximity based fashion. As the computing device and/or peripheral computing device may continuously advertise its presence via beaconing data packets, the user is not required to interact with both devices over numerous steps to pair the devices. Rather, the devices may detect each other's presence, associate with each other, then initiate the full pairing process via the second wireless communications protocol. One or both devices may signal the user to complete or confirm the pairing process. Because the devices must be within a modest radius of each other to exchange information via the first wireless communications protocol, additional levels of security can be built in to the pairing process, as opposed to merely pairing over the second wireless communications protocol.

Figure 5:
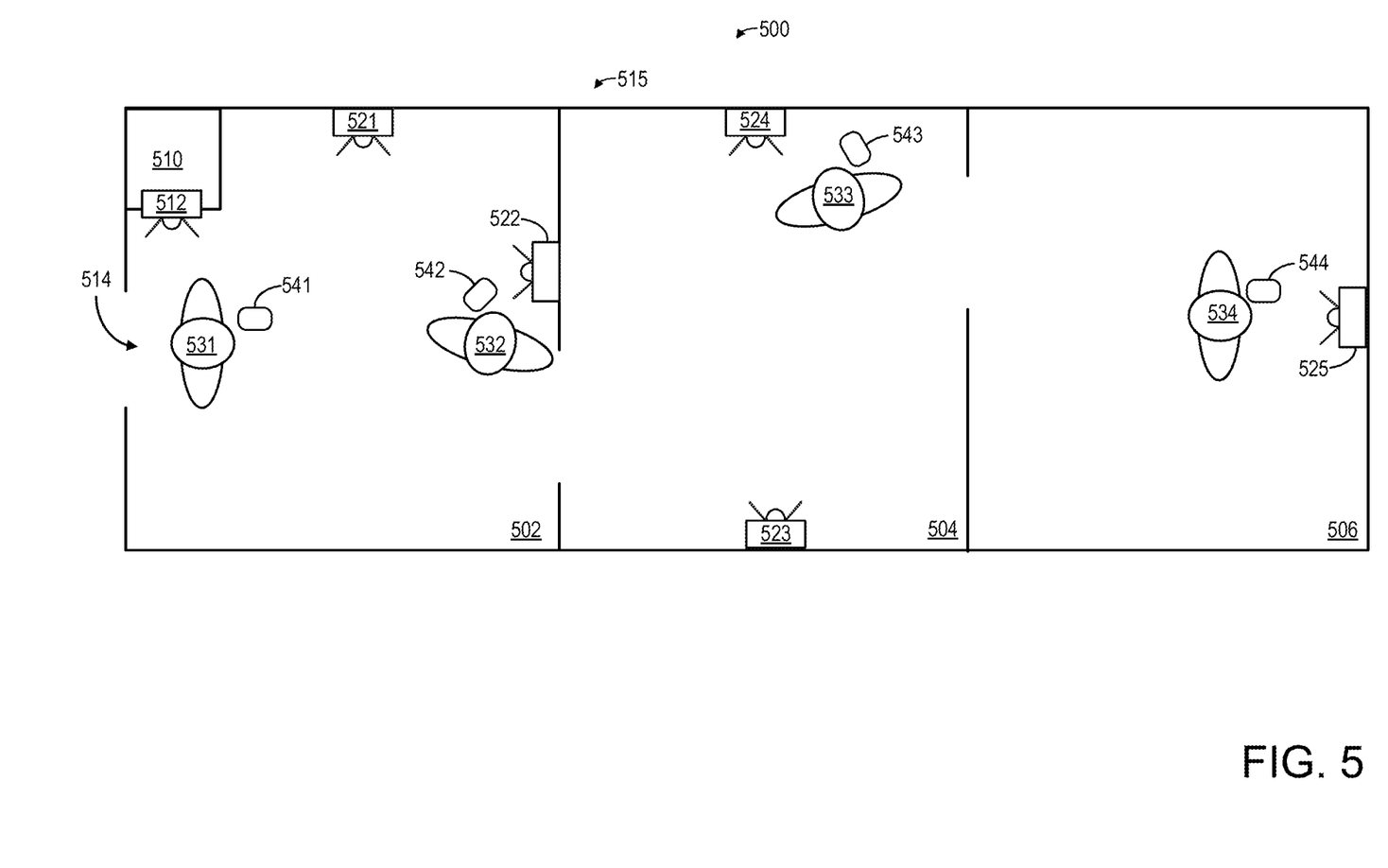
FIG. 5 depicts an example environment for operating a plurality of beaconing devices communicatively coupled to a master computing device.

FIG. 5 shows a schematic depiction of an example use environment 500 for presenting information to two or more users using local beacons. In this example, use environment 500 is configured as a multi-room museum, though such a use environment may take any suitable form. Environment 500 is depicted as including a first room 502, a second room 504, and a third room 506.

A hub computing device 510 is positioned in first room 502. However, hub computing device 501 may include componentry throughout environment 500. Hub computing device 510 includes at least a low energy transmitter 512. Low energy transmitter 512 may be considered an example of first wireless communications subsystem 212. Hub computing device 510 may further include an example of second wireless communications subsystem 218, with which to communicatively couple to wireless network 515. Hub computing device 510 is communicatively coupled to a plurality of local beacons (521, 522, 523, 524, 525) positioned throughout environment 500. For example, hub computing device 510 may control each local beacon via a master/slave relationship. Local beacons 521-525 may be considered examples of local beacons 245. Each local beacon may be configured to periodically transmit informational data packets. Low energy transmitter 521 may be configured to periodically transmit beaconing data packets including pairing information, as well as informational data packets interspersed between beaconing data packets, in some examples.

Four users are depicted within environment 500. User 531 is depicted in first room 502 with personal mobile computing device 541, proximal to low energy transmitter 512. User 532 is depicted in first room 502 with personal mobile computing device 542, proximal to local beacon 522. User 533 is depicted in second room 504 with personal mobile computing device 543, proximal to local beacon 524. User 534 is depicted in third room 506 with personal mobile computing device 544, proximal to local beacon 525.

A user entering environment 500 via entrance 514, such as user 531, may thus receive a beaconing data packet from low energy transmitter 512 via personal mobile computing device 541. The beaconing data packet may include a greeting or invitation. Personal mobile computing device may prompt user 531 to download a credentialled application for the museum prior to initiating pairing with hub computing device 510 via wireless network 515. Other aspects of the beaconing data packet may be encoded or encrypted and only translatable via the credentialled app.

Once paired, personal mobile computing device 541 may be configured to receive informational data packets from local beacons 521-525. Responsive to receiving an informational data packet from a local beacon, the credentialled application may access, download, or otherwise present relevant information to the user's immediate location. This may include information pertaining to an exhibit, directions, upcoming demonstrations or presentations, etc.

Each user may thus be presented with information via their own personal mobile computing device based on their proximity to a local beacon. In this depiction, user 532 is presented information relevant to room 502 via local beacon 522, user 533 is presented information relevant to room 504 via local beacon 524, and user 534 is presented information relevant to room 506 via local beacon 525.

As described with regard to wireless access point 240, users may utilize their own personal mobile computing devices to pair a peripheral computing device, such as a controller or wireless headset, to wireless network 515. This may enable an enhanced user experience, with direct access to audio files or control over specifically programmed interactive exhibits.

By interfacing with the credentialled application, hub computing device 510 may, after receiving permission from the users, track which users are acting on information from local beacons, and thus track user movement, individually or as a group over time, throughout the exhibit. Of course, such user tracking is only performed after permission is given by the user, and such tracking will be revoked immediately if a user revokes permission. Such user tracking may be anonymized in some implementations. This may allow hub computing device 510 to enhance user experiences by learning over time which exhibits draw interest from common sets of users. This information could also be used to guide users to exhibits and demonstrations likely to be of interest.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
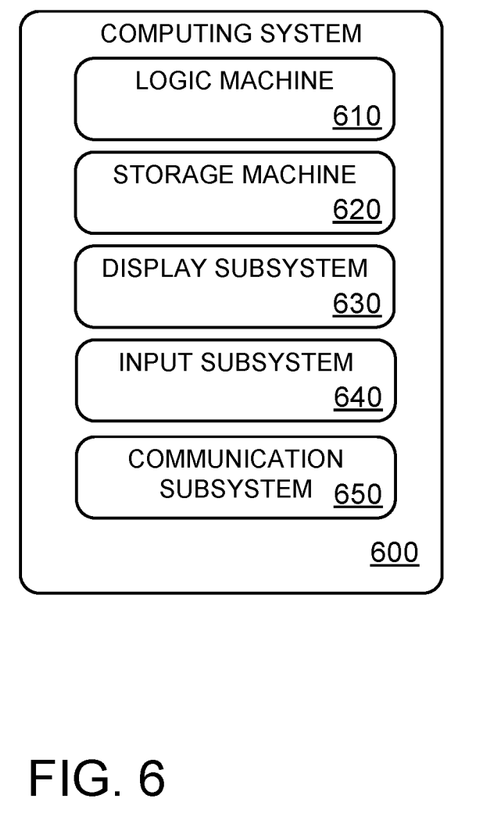
FIG. 6 schematically shows an example computing environment.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In one example, a method for a computing device comprises periodically transmitting a beaconing data packet via a first wireless communication protocol, the first wireless communication protocol supporting low bandwidth, one-directional communication; receiving a request to pair from a peripheral computing device via a second wireless communication protocol, the second wireless communication protocol supporting higher bandwidth, two-directional communication, the request to pair including information included in the beaconing data packet; and responsive to receiving the request to pair, initiating pairing with the peripheral computing device via the second wireless communication protocol. In such an example, or any other example, initiating pairing additionally or alternatively includes broadcasting a pairing request via the second wireless communication protocol, and the method additionally or alternatively comprises, in response to receiving an affirmation message from the peripheral computing device via the second wireless communication protocol, pairing with the peripheral computing device. In any of the preceding examples, or any other example, the method additionally or alternatively comprises continuing to transmit the beaconing data packet via the first wireless communication protocol while paired with the peripheral computing device via the second wireless communication protocol; and initiating pairing with one or more additional peripheral computing devices in response to receiving one or more additional requests to pair. In any of the preceding examples, or any other example, one or more informational data packets are additionally or alternatively periodically transmitted via the first wireless communication protocol, the one or more informational data packets interspersed with beaconing data packets. In any of the preceding examples, or any other example, one or more of the informational data packets additionally or alternatively include environmental information related to the peripheral computing device, and the environmental information related to the peripheral computing device is additionally or alternatively transmitted via the first wireless communication protocol while the computing device is paired with the peripheral computing device via the second wireless communication protocol. In any of the preceding examples, or any other example, the informational data packets are additionally or alternatively translatable by a credentialled application executing on the peripheral computing device. In any of the preceding examples, or any other example, pairing with the peripheral computing device via the second wireless communication protocol is additionally or alternatively mediated by the credentialled application. In any of the preceding examples, or any other example, the computing device additionally or alternatively includes both a transmitter and receiver for the first wireless communication protocol, and the method further additionally or alternatively comprises receiving counter data packets from the peripheral computing device over the first wireless communication protocol while paired with the peripheral computing device over the second wireless communication protocol.

In another example, a method for a peripheral computing device comprises receiving a periodically transmitted beaconing data packet from a computing device via a first wireless communication protocol, the first wireless communication protocol supporting low bandwidth, one-directional communication; transmitting a request to pair with the computing device via a second wireless communication protocol, the second wireless communication protocol supporting higher bandwidth, two-directional communication, the request to pair including information received in the received beaconing data packet; and receiving a pairing initiation from the computing device via the second wireless communication protocol. In such an example, or any other example, the method additionally or alternatively comprises in response to receiving the pairing initiation, transmitting an affirmation message to the computing device via the second wireless communication protocol; and pairing with the computing device. In any of the preceding examples, or any other example, the method additionally or alternatively comprises, while paired with the computing device via the second wireless communication protocol, periodically receiving one or more informational data packets from the computing device via the first wireless communication protocol, the one or more informational data packets additionally or alternatively including environmental information related to the peripheral computing device. In any of the preceding examples, or any other example, the peripheral computing device additionally or alternatively includes both a transmitter and receiver for the first wireless communication protocol, and the method additionally or alternatively comprises, while paired with the computing device via the second wireless communication protocol, transmitting counter data packets to the computing device via the first wireless communication protocol. In any of the preceding examples, or any other example, the method additionally or alternatively comprises responsive to receiving the periodically transmitted beaconing data packet from the computing device via the first wireless communication protocol, indicating to a user that a beacon has been located in a local environment. In any of the preceding examples, or any other example, the peripheral computing device is additionally or alternatively a user input device configured to provide user input to the computing device when paired over the second wireless communication protocol. In any of the preceding examples, or any other example, the peripheral computing device is additionally or alternatively configured to execute an application configured to mediate communication with the computing device via the second wireless communication protocol based on one or more data packets received from the computing device via the first wireless communication protocol.

In yet another example, a computing device comprises a first wireless communications subsystem configured to periodically transmit data packets via a first wireless communication protocol, the first wireless communication protocol supporting low bandwidth, one-directional communication; a second wireless communications subsystem configured to mediate two-directional communications with one or more peripheral computing devices via a second wireless communication protocol, the second wireless communication protocol supporting higher bandwidth, higher energy communication than the first wireless communication protocol; and a controller configured to: periodically transmit a beaconing data packet via the first wireless communications subsystem; receive pairing requests from one or more peripheral computing devices via the second wireless communications subsystem; and responsive to receiving a pairing request from a peripheral computing device, initiate pairing with the peripheral computing device via the second wireless communications subsystem. In such an example, or any other example, the controller is additionally or alternatively configured to: generate informational data packets targeted to a paired peripheral computing device; and transmit the informational data packets via the first wireless communications subsystem. In any of the preceding examples, or any other example, the informational data packets are additionally or alternatively translatable by a credentialled application executing on the paired peripheral computing device. In any of the preceding examples, or any other example, the computing device additionally or alternatively comprises a plurality of local beacons positioned within an environment; and wherein the controller is further configured to disperse informational data packets for transmission by each of the plurality of local beacons via the first wireless communications subsystem, each informational data packet encoded for translation by the credentialled application. In any of the preceding examples, or any other example, the computing device additionally or alternatively comprises a wireless access point, and wherein credentials for connecting to the wireless access point are encoded in an informational data packet translatable by the credentialled application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a computing device, comprising:
periodically transmitting a beaconing data packet via a first wireless communication protocol, the first wireless communication protocol supporting low bandwidth, one-directional communication;
receiving a request to pair from a peripheral computing device via a second wireless communication protocol, the second wireless communication protocol supporting higher bandwidth, two-directional communication, the request to pair including information included in the beaconing data packet;
responsive to receiving the request to pair, initiating pairing with the peripheral computing device via the second wireless communication protocol; and
periodically transmitting one or more encoded informational data packets interspersed with beaconing data packets via the first wireless communication protocol, the one or more encoded informational data packets decodable by the peripheral computing device while the peripheral computing device is paired with the computing device via the second wireless communication protocol, the informational data packets decodable based on information exchanged between the computing device and the peripheral computing device over the first wireless communication protocol or over the second wireless communication protocol, during or after pairing of the computing device and the peripheral computing device.

2. The method of claim 1, wherein initiating pairing includes broadcasting a pairing request via the second wireless communication protocol, and wherein the method further comprises:
in response to receiving an affirmation message from the peripheral computing device via the second wireless communication protocol, pairing with the peripheral computing device.

3. The method of claim 2, further comprising:
continuing to transmit the beaconing data packet via the first wireless communication protocol while paired with the peripheral computing device via the second wireless communication protocol; and
initiating pairing with one or more additional peripheral computing devices in response to receiving one or more additional requests to pair.

4. The method of claim 2, wherein the computing device includes both a transmitter and receiver for the first wireless communication protocol, and wherein the method further comprises:
receiving counter data packets from the peripheral computing device over the first wireless communication protocol while paired with the peripheral computing device over the second wireless communication protocol.

5. The method of claim 1, wherein one or more of the informational data packets include environmental information related to the peripheral computing device.

6. The method of claim 1, wherein the informational data packets are translatable by a credentialled application executing on the peripheral computing device.

7. The method of claim 6, wherein pairing with the peripheral computing device via the second wireless communication protocol is mediated by the credentialled application.

8. A method for a peripheral computing device, comprising:
receiving a periodically transmitted beaconing data packet from a computing device via a first wireless communication protocol, the first wireless communication protocol supporting low bandwidth, one-directional communication;
transmitting a request to pair with the computing device via a second wireless communication protocol, the second wireless communication protocol supporting higher bandwidth, two-directional communication, the request to pair including information received in the received beaconing data packet;
receiving a pairing initiation from the computing device via the second wireless communication protocol;
pairing with the computing device via the second wireless communication protocol;
receiving one or more periodically transmitted encoded informational data packets from the computing device, the encoded informational data packets interspersed with beaconing data packets via the first wireless communication protocol; and
while paired with the computing device via the second wireless communication protocol, decoding the one or more periodically transmitted encoded informational data packets based on information exchanged between the computing device and the peripheral computing device over the first wireless communication protocol or over the second wireless communication protocol, during or after pairing of the computing device and the peripheral computing device.

9. The method of claim 8, further comprising:
in response to receiving the pairing initiation, transmitting an affirmation message to the computing device via the second wireless communication protocol.

10. The method of claim 9, wherein the one or more informational data packets including environmental information related to the peripheral computing device.

11. The method of claim 9, wherein the peripheral computing device includes both a transmitter and receiver for the first wireless communication protocol, and wherein the method further comprises:
while paired with the computing device via the second wireless communication protocol, transmitting counter data packets to the computing device via the first wireless communication protocol.

12. The method of claim 8, further comprising:
responsive to receiving the periodically transmitted beaconing data packet from the computing device via the first wireless communication protocol, indicating to a user that a beacon has been located in a local environment.

13. The method of claim 8, wherein the peripheral computing device is a user input device configured to provide user input to the computing device when paired over the second wireless communication protocol.

14. The method of claim 8, wherein the peripheral computing device is configured to execute an application configured to mediate communication with the computing device via the second wireless communication protocol based on one or more data packets received from the computing device via the first wireless communication protocol.

15. A computing device, comprising:
- a first wireless communications subsystem configured to periodically transmit data packets via a first wireless communication protocol, the first wireless communication protocol supporting low bandwidth, one-directional communication;
- a second wireless communications subsystem configured to mediate two-directional communications with one or more peripheral computing devices via a second wireless communication protocol, the second wireless communication protocol supporting higher bandwidth, higher energy communication than the first wireless communication protocol; and
- a controller configured to:
  - periodically transmit a beaconing data packet via the first wireless communications subsystem;
  - receive pairing requests from one or more peripheral computing devices via the second wireless communications subsystem;
  - responsive to receiving a pairing request from a peripheral computing device, initiate pairing with the peripheral computing device via the second wireless communications subsystem;
  - generate encoded informational data packets targeted to a paired peripheral computing device, the encoded informational data packets are translatable by a credentialled application executing on the paired peripheral computing device; and
  - transmit the informational data packets interspersed with beaconing data packets via the first wireless communications subsystem.

16. The computing device of claim 15, further comprising:
a plurality of local beacons positioned within an environment; and wherein the controller is further configured to disperse informational data packets for transmission by each of the plurality of local beacons via the first wireless communications subsystem, each informational data packet encoded for translation by the credentialled application.

17. The computing device of claim 15, further comprising a wireless access point, and wherein credentials for connecting to the wireless access point are encoded in an informational data packet translatable by the credentialled application.

* * * * *